(12) United States Patent
Komatsu

(10) Patent No.: US 11,429,324 B2
(45) Date of Patent: Aug. 30, 2022

(54) DATA PROCESSING APPARATUS, STORAGE MEDIUM, AND CONTROL METHOD FOR OBTAINING INFORMATION ABOUT AN APPARATUS

(71) Applicant: CANON KABUSHIKI KAISHA, Tokyo (JP)

(72) Inventor: Kohei Komatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/081,449

(22) Filed: Oct. 27, 2020

(65) Prior Publication Data

US 2021/0132876 A1    May 6, 2021

(30) Foreign Application Priority Data

Oct. 31, 2019   (JP) .............................. JP2019-199112

(51) Int. Cl.
```
G06F 3/12        (2006.01)
H04W 4/80        (2018.01)
H04B 17/318      (2015.01)
H04W 4/02        (2018.01)
H04M 1/725       (2021.01)
H04M 1/72409     (2021.01)
H04W 84/12       (2009.01)
```
(52) U.S. Cl.
CPC .......... *G06F 3/1226* (2013.01); *G06F 3/1204* (2013.01); *G06F 3/1209* (2013.01); *H04B 17/318* (2015.01); *H04M 1/72409* (2021.01); *H04W 4/023* (2013.01); *H04W 4/026* (2013.01); *H04W 4/80* (2018.02); *G06F 3/1292* (2013.01); *H04W 84/12* (2013.01)

(58) Field of Classification Search
CPC .... G06F 3/1226; G06F 3/1204; G06F 3/1209; G06F 3/1292; H04B 17/318; H04M 1/72409; H04W 4/80; H04W 4/023; H04W 4/026; H04W 84/12
USPC ....................................................... 358/1.15
See application file for complete search history.

(56) References Cited

U.S. PATENT DOCUMENTS

| | | | |
|---|---|---|---|
| 9,560,185 B2 * | 1/2017 | Nelson | H04M 1/72448 |
| 10,772,156 B2 * | 9/2020 | Shim | H04W 12/06 |
| 10,778,830 B2 * | 9/2020 | Jang | H04L 12/282 |
| 10,915,296 B2 * | 2/2021 | Chang | G06Q 20/405 |
| 2007/0257985 A1 * | 11/2007 | Estevez | G08B 13/19663 348/143 |
| 2014/0079426 A1 * | 3/2014 | Robinson | G03G 15/5016 399/82 |
| 2018/0032291 A1 * | 2/2018 | Goto | G06F 3/1221 |
| 2018/0152591 A1 * | 5/2018 | Sato | G06F 3/1292 |

FOREIGN PATENT DOCUMENTS

JP        2018-086769 A      6/2018

* cited by examiner

*Primary Examiner* — Allen H Nguyen
(74) *Attorney, Agent, or Firm* — Canon U.S.A., Inc. IP Division

(57) ABSTRACT

In a case where a mobile terminal searches for print processing apparatuses, a method controlling the mobile terminal includes causing the mobile terminal to display information indicating a distance to each print processing apparatus as search results, together with information such as apparatus names of print processing apparatuses.

20 Claims, 19 Drawing Sheets

FIG.14

| STATUS | MEANING | DISTANCE |
|---|---|---|
| IMMEDIATE | IN FRONT OF PRINTER | UP TO 60 CM |
| NEAR | WITHIN SIGHT OF PRINTER | 60 CM TO 3 M |
| FAR | RADIO WAVE REACHING | 3 M OR MORE |
| UNKNOWN | NO RADIO WAVE (UNKNOWN) | — |

1400 DISTANCE TABLE

DATA PROCESSING APPARATUS, STORAGE MEDIUM, AND CONTROL METHOD FOR OBTAINING INFORMATION ABOUT AN APPARATUS

BACKGROUND

Field

The present disclosure relates to a data processing apparatus, a storage medium, and a control method.

Description of the Related Art

Recently, the use of high-performance mobile terminals, i.e., smartphones, has become widespread, with some of these mobile terminals providing a print function as standard function of the mobile terminal's operating system (OS). For example, AirPrint® is installed in iOS®, which is an OS for Apple, Inc. smartphones.

Using the AirPrint® function, a mobile terminal first searches a local area network (LAN) for print processing apparatuses using Wireless Fidelity (Wi-Fi®). Next, the mobile terminal reads a Joint Photographic Experts Group (JPEG) image file or a Portable Document Format (PDF) document file stored therein, and converts the read file into page description language (PDL) data supported by a print processing apparatus found in the search. The mobile terminal then generates a print job by adding information about various print settings (e.g. paper source, copies) to the PDL data, and transmits the print job to a print processing apparatus. The mobile terminal thus executes a series of processes necessary for printing.

Searching for print processing apparatuses using the AirPrint® function includes, for example, the mobile terminal performing a search using multicast Domain Name System (mDNS) to find supported print processing apparatuses on the LAN. The mobile terminal attempts to communicate, using the Internet Printing Protocol (IPP), with each print processing apparatus that responded to the search and is supported by the mobile terminal, and displays information such as a name and a status of the supported print processing apparatus obtained therefrom, in a list form as results of the search.

There is also a Bluetooth® Low Energy advertisement packet format called AirPrint Bluetooth Beacon. Another example of searching for print processing apparatuses, Japanese Patent Application Laid-Open No. 2018-86769 discusses a technique in which a mobile terminal obtains internet protocol (IP) information from AirPrint Bluetooth Beacons transmitted from print processing apparatuses, and then uses the obtained IP information to perform communication using the IPP as with the above-described case, so that the mobile terminal can display information such as the name of the supported print processing apparatus included in the response therefrom, in a list form as results of the search.

In a case where the apparatus information obtained using IPP communication is displayed in a list form as the search results, information such as the apparatus name is displayed, but information about a position of the apparatus is not displayed. Therefore, if a plurality of print processing apparatuses is found in the search, there is a possibility that a user cannot easily identify a desired apparatus.

SUMMARY

The present disclosure is directed to a technique for enabling a user to easily identify a desired print processing apparatus from search results in a case where the user searches for print processing apparatuses using a mobile terminal.

According to an aspect of the present disclosure, a method for controlling a terminal that searches for an image processing apparatus includes receiving a packet using a first wireless communication method, obtaining apparatus information from an image processing apparatus using a second wireless communication method different from the first wireless communication method, and displaying, in association with apparatus information obtained from an image processing apparatus identified by the received packet, information based on a strength of a radio wave relating to the first wireless communication method from the image processing apparatus, as a result of the search.

Further features will become apparent from the following description of exemplary embodiments with reference to the attached drawings.

BRIEF DESCRIPTION OF THE DRAWINGS

FIG. 14 is a table illustrating a distance table.

DESCRIPTION OF THE EMBODIMENTS

Exemplary embodiments will be described in detail below with reference to the attached drawings. In the exemplary embodiments, a print processing apparatus is described as an example of an image processing apparatus. However, the exemplary embodiments are not meant to limit the scope of the present disclosure as encompassed by the appended claims. Not all combinations of features described in the exemplary embodiments are essential for solving means of the present disclosure.

A first exemplary embodiment will be described in detail with reference to the attached drawings.

Figure 1:
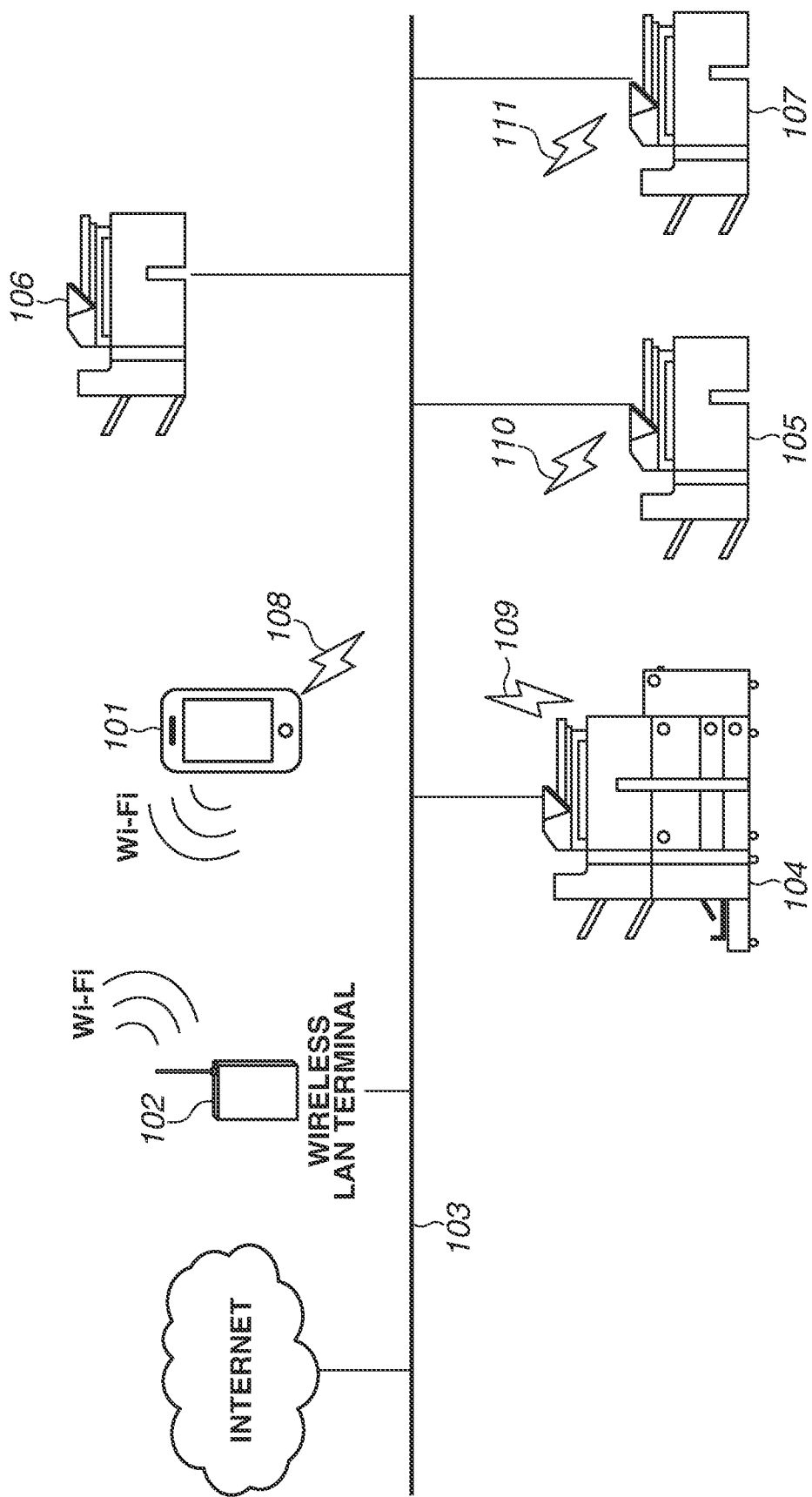
FIG. 1 is a diagram illustrating a configuration of a data processing system according to a first exemplary embodiment.

FIG. 1 illustrates a configuration of a data processing system according to the first exemplary embodiment. In FIG. 1, a data processing apparatus 101 is a mobile computer that can transmit a print job to any of print processing apparatuses 104, 105, 106, and 107. The print processing apparatuses 104, 105, 106, and 107 can include a copy function, a scanner function, and a facsimile transmission function in addition to a printer function.

The data processing apparatus 101 and the print processing apparatuses 104, 105, 106, and 107 are connected to a local area network (LAN) 103, and perform mutual communication to exchange information via the LAN 103. A wireless LAN terminal 102 is a wireless LAN master unit having a general network/router function, and provides a wireless LAN via Wi-Fi®. The data processing apparatus 101 is a mobile terminal that can connect to the LAN 103 via the wireless LAN terminal 102 by enabling a Wi-Fi® function. If the data processing apparatus 101 enters a wireless LAN area provided by the wireless LAN terminal 102, the data processing apparatus 101 can automatically participate in the LAN 103 using authentication information set in advance. Radio signals 108, 109, 110, and 111 are transmitted and received by the data processing apparatus 101 and the print processing apparatuses 104, 105, and 107, respectively, using Bluetooth® Low Energy, and a wireless personal area network (WPAN) can be formed among the apparatuses that can mutually transmit and receive such radio signals. In the present exemplary embodiment, the print processing apparatus 106 is not provided with a Bluetooth® beacon. In addition, the data processing apparatus 101 is sufficiently far from the print processing apparatus 107 and cannot receive Bluetooth® beacon signals from the print processing apparatus 107.

Figure 2:
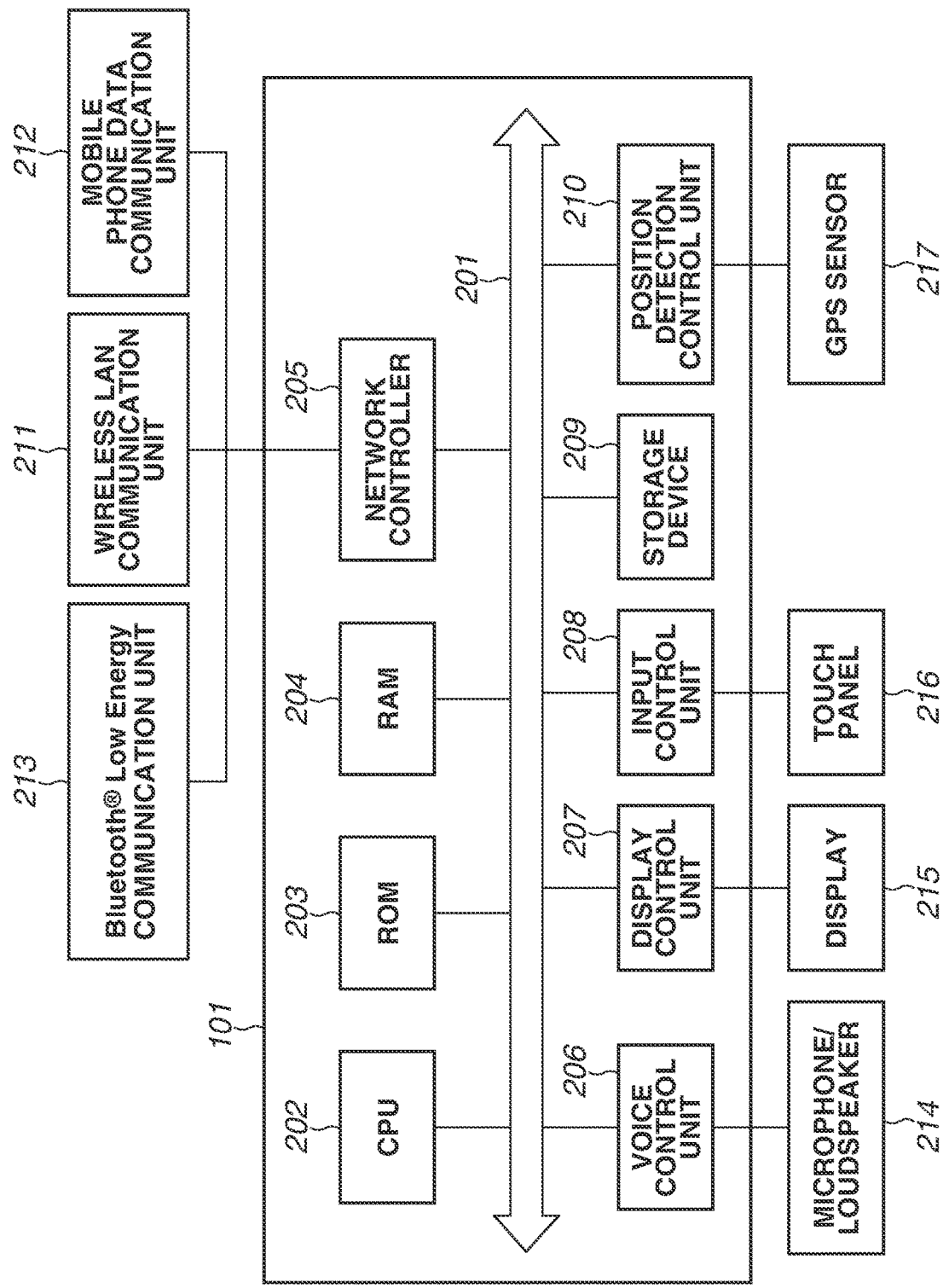
FIG. 2 is a block diagram illustrating a hardware configuration of a data processing apparatus.

FIG. 2 is a block diagram illustrating a hardware configuration of the data processing apparatus 101 illustrated in FIG. 1. The data processing apparatus 101 is a terminal, such as a smartphone or a tablet, and an operating system (OS) for the terminal and a program for controlling calls and data communication can be operated therein. Alternatively, the data processing apparatus 101 can be a personal computer not including a voice control unit 206, a microphone/loudspeaker 214, a position detection control unit 210, a Global Positioning System (GPS) sensor 217, and a mobile phone data communication unit 212, which will be described below.

Each component of the hardware is connected to a system bus 201. A read-only memory (ROM) 203 stores an OS in the data processing apparatus 101 and applications for controlling calls and data communication that are executed by a central processing unit (CPU) 202.

Applications for controlling data communication include a print application, electronic mail software, and a Web browser.

A random access memory (RAM) 204 is a memory for executing a program and is a work memory area used by an application to execute a program. The RAM 204 is also a memory for temporarily storing data that needs to be stored temporarily when the application executes the program. A storage device 209 is a nonvolatile storage device that stores various operation mode settings and operation logs to be stored even after reboot of the data processing apparatus 101.

A network controller 205 controls communication by a wireless LAN communication unit 211 for participating in the LAN 103 via the wireless LAN terminal 102, communication by the mobile phone data communication unit 212 for participating in a network provided by a mobile phone carrier, and communication by a Bluetooth® Low Energy communication unit 213 for forming a WPAN among computer devices that can mutually transmit and receive Bluetooth® Low Energy radio signals. Generally, in a case where the data processing apparatus 101 can participate in a wireless LAN, the network controller 205 prioritizes the wireless LAN connection. There is exclusive control that causes the data processing apparatus 101 to participate in a wireless communication network provided by the mobile phone carrier in a case where the data processing apparatus 101 moves outside the wireless LAN. In Bluetooth® Low Energy communication, communication control that excludes the other communication units is not performed.

The voice control unit 206 is used, for example, while a user is making a phone call after start of a call application. The microphone/loudspeaker 214 inputs and outputs voice data, and the voice control unit 206 mediates between the voice data and a voice data control program.

A display control unit 207 controls information to be output to a display 215 of the data processing apparatus 101. An input control unit 208 controls information designated by a user via a button and a touch panel 216 of the data processing apparatus 101. Applications to be started in the data processing apparatus 101 using the voice control unit 206, the display control unit 207, and the input control unit 208 provides the user with network communication information and various pieces of information of the data processing apparatus 101.

The position detection control unit 210 obtains position information about the data processing apparatus 101 from the GPS sensor 217 and provides the position information to the OS. The OS running on the CPU 202 performs the above-described control.

Figure 3:
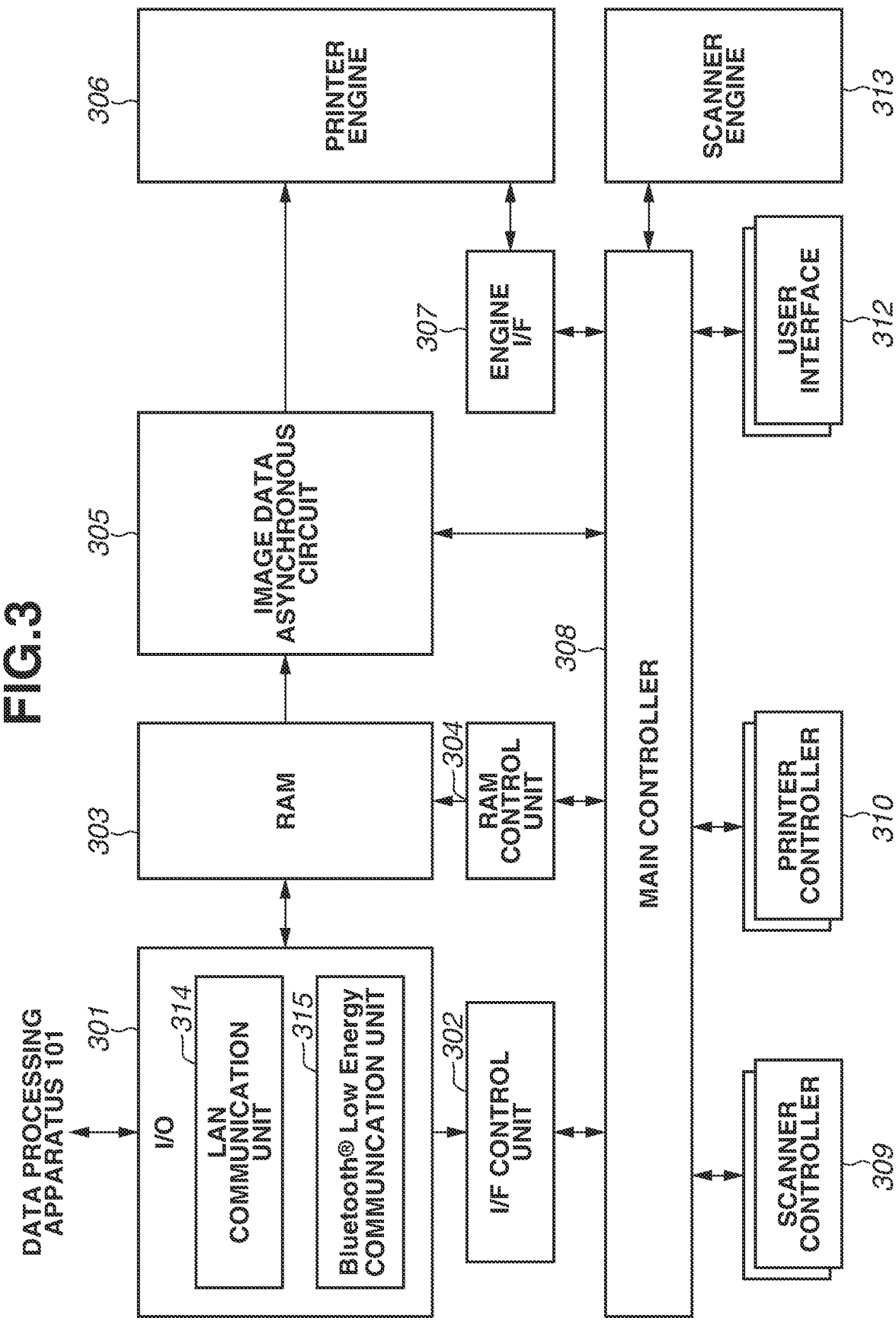
FIG. 3 is a block diagram illustrating a hardware configuration of a print processing apparatus.

FIG. 3 is a block diagram illustrating a hardware configuration of each of the print processing apparatuses 104 to 107 illustrated in FIG. 1. A multifunction peripheral (MFP) having a scanner function and a printer function is described as an example of the print processing apparatuses 104 to 107 according to the present exemplary embodiment.

In FIG. 3, an input/output (I/O) 301 includes, for example, a LAN communication unit 314 and a Bluetooth® Low Energy communication unit 315. The LAN communication unit 314 can communicate with the data processing apparatus 101 via a network such as the LAN 103. The Bluetooth® Low Energy communication unit 315 can communicate with an apparatus within a WPAN in which Bluetooth® Low Energy radio signals can be transmitted and received. Each of the print processing apparatuses 104 to 107 transmits a device identification (ID) and a scanned image to the data processing apparatus 101 via the I/O 301.

Each of the print processing apparatuses 104 to 107 receives various control commands from the data processing apparatus 101 having received instructions, and performs processing. An interface (I/F) control unit 302 performs control to issue a device identification (ID) for a processing system such as a scanner, a printer, or a facsimile mounted in each of the print processing apparatuses 104 to 107. A RAM 303 is a primary storage device used to store external data such as a control command obtained by the I/O 301, and image data (hereinafter referred to as an image) read by a scanner engine 313. The RAM 303 is used to store an image rasterized by a printer controller 310 before being transmitted to a printer engine 306. A RAM control unit 304 manages an allocation of the RAM 303. An image data asynchronous circuit 305 outputs the image rasterized by the printer controller 310 or the image read by the scanner engine 313 and loaded into the RAM 303, based on a rotation of the printer engine 306. The printer engine 306 develops an image on an output medium such as paper. A main controller 308 performs various types of control of the printer engine 306 via an engine I/F 307. The main controller 308 is a core control module and sorts a control language received from the data processing apparatus 101 via the I/O 301 into a scanner controller 309 and the printer controller 310. The main controller 308 controls the printer engine 306 and the scanner engine 313 in response to an instruction received from the respective controllers and a user interface 312. The scanner controller 309 decomposes a scan control command received from the data processing apparatus 101 into an internal execution instruction that can be interpreted by the main controller 308. The scanner controller 309 further converts the image read by the scanner engine 313 into a scan control command. The printer controller 310 decomposes a page description language (PDL) received as a print job from the data processing apparatus 101 into an internal execution instruction including a rasterized image which can be interpreted by the main controller 308. The rasterized image is transmitted to the printer engine 306 and printed on an output medium such as paper.

Figure 4:
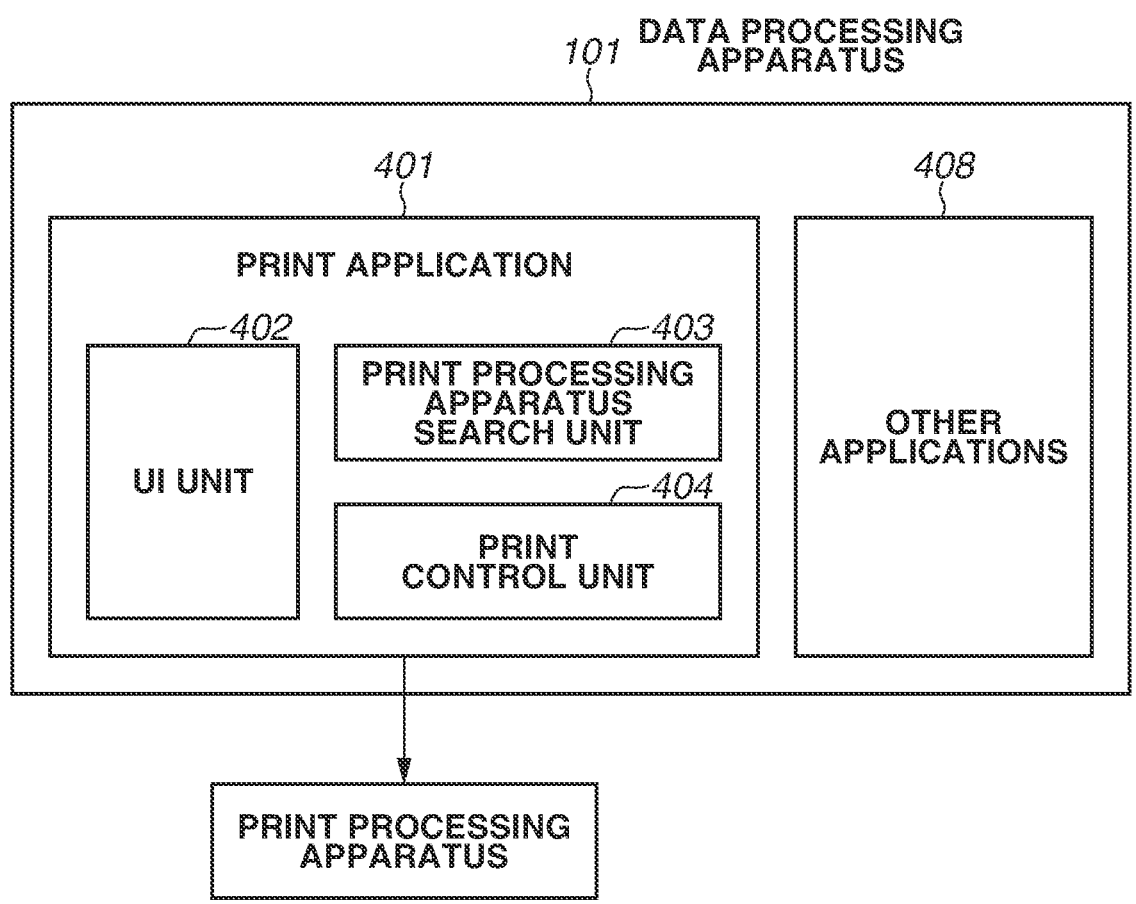
FIG. 4 is a block diagram illustrating a software configuration of the data processing apparatus.

FIG. 4 is a block diagram illustrating a software configuration of the data processing apparatus 101 illustrated in FIG. 1. A print application 401 executes processing according to the present exemplary embodiment on the data processing apparatus 101, and is installed in the ROM 203 as an application running on the OS. A user interface (UI) unit 402 of the print application 401 enables the user to set an application-specific function. A print processing apparatus search unit 403 enables the data processing apparatus 101 to search for print processing apparatuses on the LAN 103, which the data processing apparatus 101 participates in, by using multicast Domain Name System (mDNS). The print processing apparatus search unit 403 provides a function of obtaining, by using the Internet Printing Protocol (IPP) or Internet Printing Protocol Secure (IPPS), detailed information of a print processing apparatus to which the data processing apparatus 101 can issue a print instruction (i.e. a print processing apparatus supported by the print application 401) among print processing apparatuses reachable via the LAN 103. The communication method is not limited to mDNS and IPP. The print processing apparatus search unit 403 provides a function of searching, within the WPAN in which Bluetooth® Low Energy radio signals can be transmitted and received, for print processing apparatuses to which the data processing apparatus 101 can issue a print instruction. A print control unit 404 provides a function of generating a print job and transmitting the print job to a print processing apparatus communicable with the data processing apparatus 101. The print application 401 can have a function of instructing a print processing apparatus to perform scanning, in addition to the print instruction function.

Figure 5:
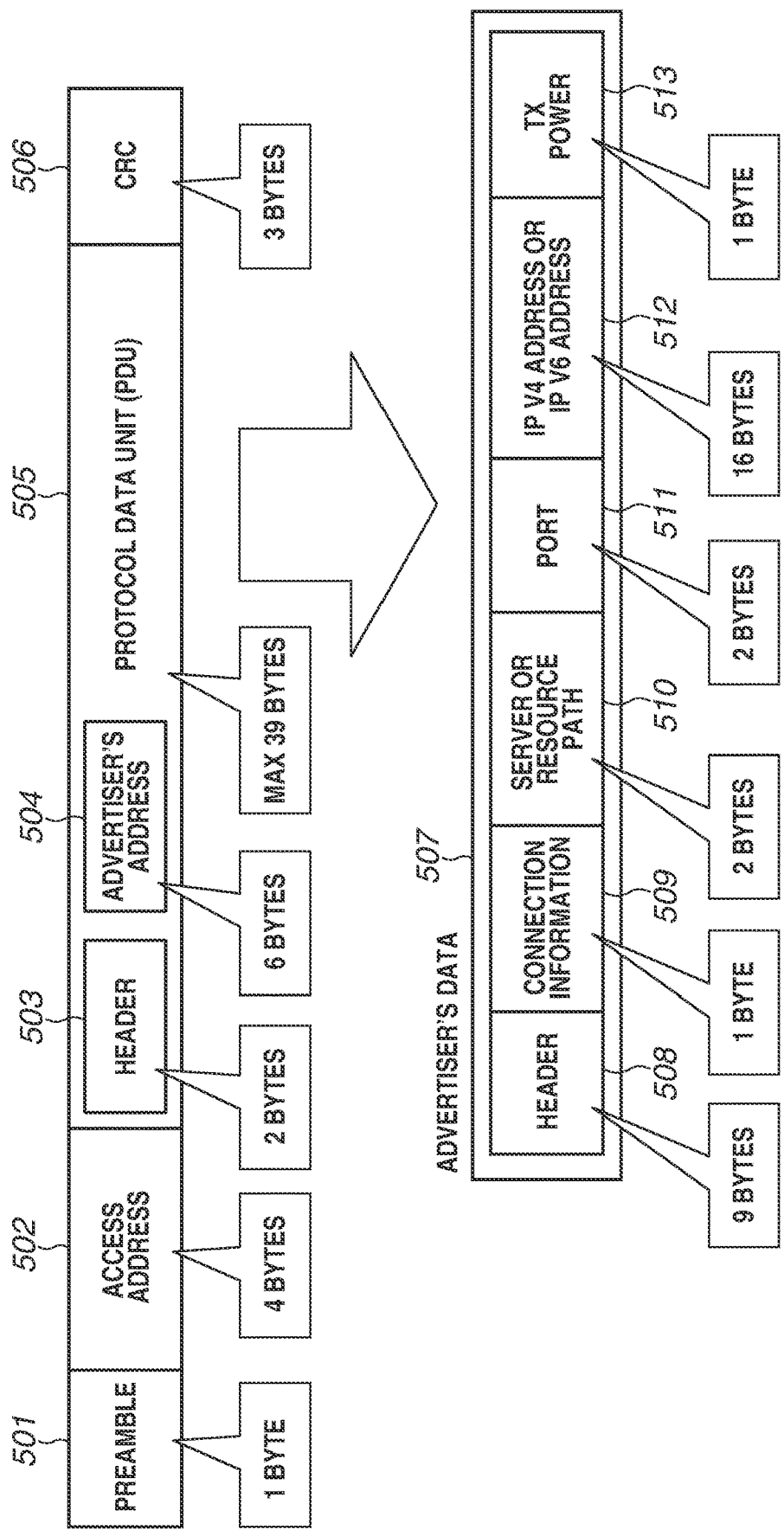
FIG. 5 is a diagram illustrating an example of a Bluetooth® Low Energy advertisement packet.

FIG. 5 illustrates an example of Bluetooth® Low Energy advertisement packets transmitted from the print processing apparatuses 104, 105, and 107. There is a plurality of formats for the Bluetooth® Low Energy advertisement packets transmitted from the print processing apparatuses 104 and 105. In the present exemplary embodiment, the print processing apparatuses 104 and 105 are assumed to transmit advertisement packets in an AirPrint Bluetooth Beacon format. The Bluetooth® Low Energy advertisement packet is beacon data that is broadcast as a beacon signal and is transmitted at intervals of several milliseconds to several seconds.

A preamble 501 of 1 byte to be used by a Bluetooth® Low Energy radio element at a timing of reading a signal is included at a head of the Bluetooth® Low Energy advertisement packet. An access address 502 of 4 bytes is included to insert a value indicating the Bluetooth® Low Energy advertisement packet. A protocol data unit 505 of a maximum of 39 bytes is included as an actual data area. The protocol data unit 505 consumes 2 bytes as a header 503 and 6 bytes as an advertiser's address 504, so that the remaining 31 bytes forms advertiser's data 507. The AirPrint Bluetooth Beacon format will be described as an example of the advertiser's data 507. A header 508 of 9 bytes is included, which is a common value of the AirPrint Bluetooth Beacon. Connection information 509 of 1 byte is included, which indicates an IP address format, and whether a print processing apparatus transmitting the advertisement packet is a printer or a print server. A "server or resource path" 510 of 2 bytes is included, which indicates printer ID information defined by the server. A port 511 of 2 bytes is included as a port number. An IP address (IP v4 address or IP v6 address) 512 of 16 bytes is included. TX power 513 of 1 byte is included, which indicates a strength of a signal transmitted by the beacon. At a tail end of the Bluetooth® Low Energy advertisement packet, a cyclic redundancy code (CRC) 506 of 3 bytes is included to detect a code error, and thus the entire advertisement packet is constructed.

Figure 6:
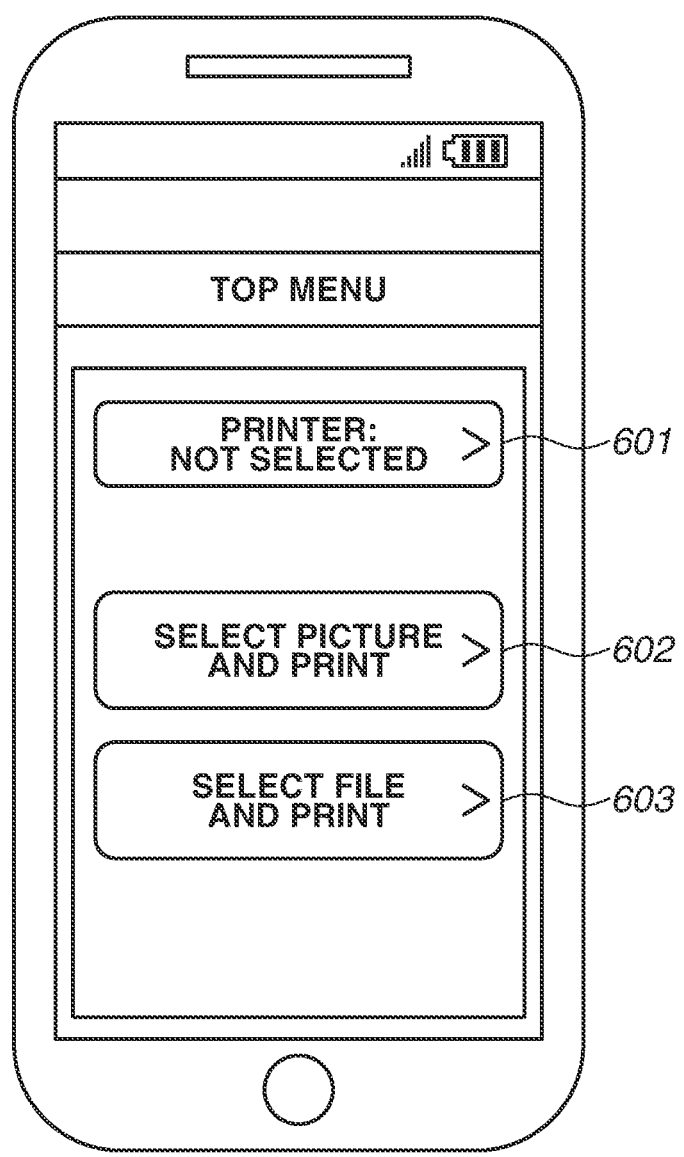
FIG. 6 is a diagram illustrating a function selection screen displayed on the data processing apparatus.

FIG. 6 illustrates a top menu screen displayed on the data processing apparatus 101 immediately after start of the print application 401. The top menu screen is a user interface for receiving various input operations from the user. A button 601 is used to shift to a screen for selecting a print processing apparatus as a print instruction destination. In a case where a print processing apparatus is not selected, a message indicating that a print processing apparatus is not selected is displayed, as indicated by the button 601. A button 602 is used to shift to a screen for selecting a picture stored in the data processing apparatus 101 and printing the picture. In a case where a print processing apparatus is not selected as the print instruction destination, the button 602 is disabled even if pressed. A button 603 is used to shift to a screen for selecting a Portable Document Format (PDF) file and the like stored in the data processing apparatus 101 and printing the file. In a case where a print processing apparatus is not selected as the print instruction destination, the button 603 is disabled even if pressed, as with the button 602.

Figure 7:
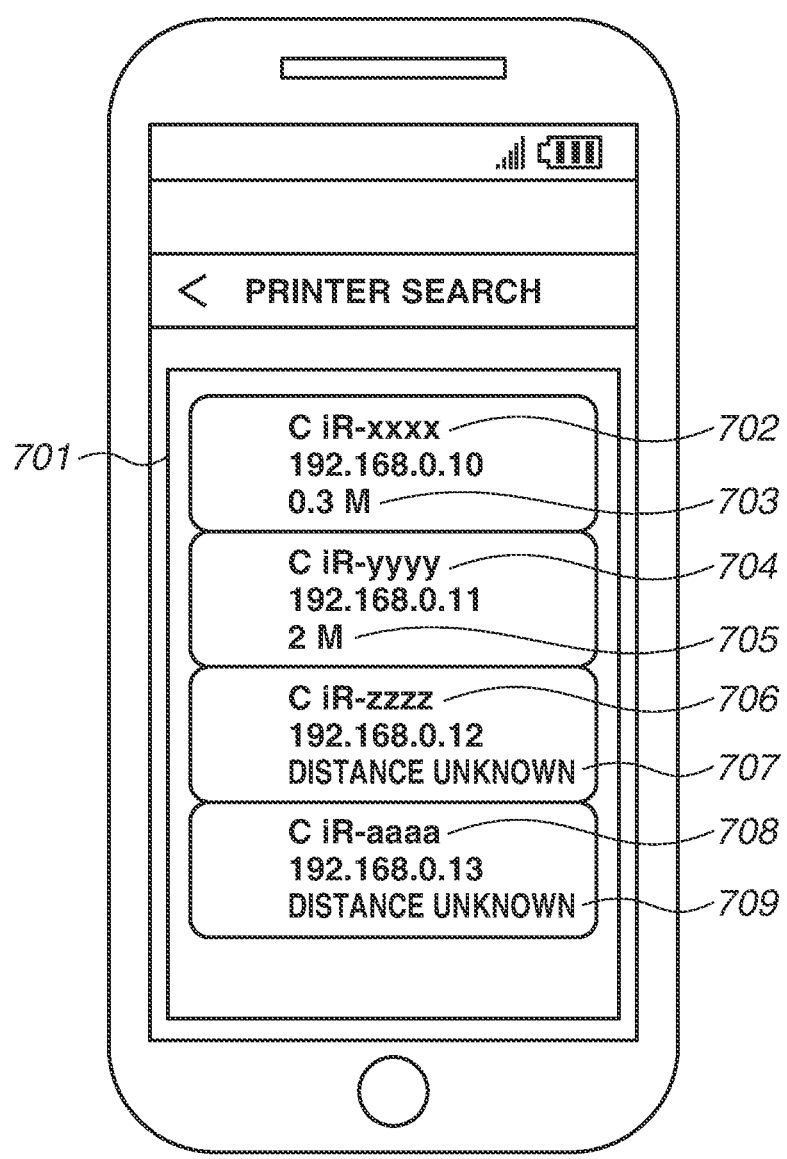
FIG. 7 is a diagram illustrating a print processing apparatus selection screen displayed on the data processing apparatus according to the first exemplary embodiment.

FIG. 7 illustrates a selection screen 701 for selecting a print processing apparatus as the print instruction destination, which is displayed in a case where the button 601 illustrated in FIG. 6 is pressed. The selection screen 701 is a user interface for displaying a list of search results of print processing apparatuses. The selection screen 701 will be described in detail below. Before describing a flowchart illustrated in FIG. 8, an outline of communication performed by the data processing apparatus 101 when searching for print processing apparatuses will be described. In order to search for print processing apparatuses on the LAN, the data processing apparatus 101 broadcasts a search request using mDNS. A print processing apparatus having responded to the search request transmits an IP address thereof to the data processing apparatus 101. The data processing apparatus 101 uses the received IP address to request detailed information of the print processing apparatus using IPP communication or IPPS communication (wireless LAN communication), and obtains the detailed information from the print processing apparatus. The detailed information includes, for example, an apparatus name. In this search, the detailed information of the print processing apparatus such as the apparatus name can be obtained, but positional information such as a distance of the print processing apparatus from the data processing apparatus 101 cannot be obtained.

A method using the Bluetooth® Low Energy advertisement packet transmitted from a print processing apparatus can be considered to obtain distance information. The distance information can be obtained based on a radio wave strength of the received packet, but a packet in a predetermined format, such as the AirPrint Bluetooth Beacon, cannot include desired information such as an apparatus name therein. There is a possibility that the information such as the apparatus name cannot be obtained only using the information of the packet. Thus, in the present exemplary embodiment, the detailed information of the print processing apparatus that can be obtained using wireless LAN communication, and the positional information that can be obtained using Bluetooth® Low Energy are displayed as the search results on the same screen. Obtaining the positional information using Bluetooth® Low Energy enables the user to identify the distance to each print processing apparatus found in the search, and also identify a print processing apparatus relatively close to the user.

Figure 8:
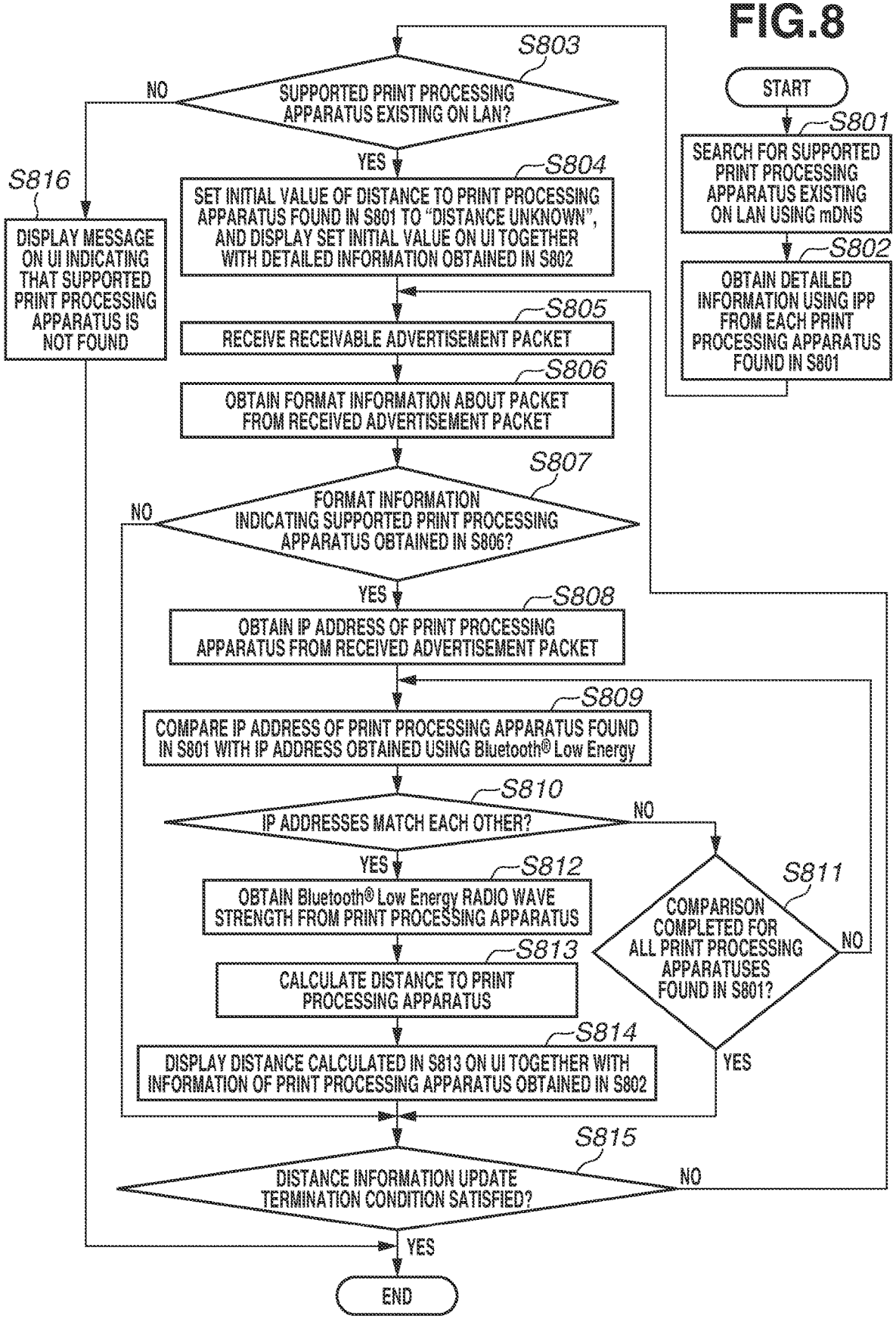
FIG. 8 is a flowchart illustrating a processing flow performed by the data processing apparatus according to the first exemplary embodiment.

Operations of processing for searching for print processing apparatuses performed by the data processing apparatus 101 in order to display the selection screen 701 illustrated in FIG. 7 will be described with reference to FIG. 8. More specifically, FIG. 8 is a flowchart illustrating the processing for searching for print processing apparatuses performed by the CPU 202 in the data processing apparatus 101 in which the print application 401 is being executed.

In step S801, the data processing apparatus 101 uses mDNS to search for print processing apparatuses existing on the LAN 103, which the data processing apparatus 101 participates in, and supported by the print application 401. Each of print processing apparatuses having responded to the search transmits identification information such as the IP address thereof to the data processing apparatus 101. A protocol used to search for print processing apparatus on the LAN 103 is not limited to mDNS, and another protocol can be used.

In step S802, the data processing apparatus 101 uses the received IP address to request the detailed information of each of the print processing apparatuses found in step S801 by using the IPP, and obtains the detailed information therefrom. Here, the print processing apparatuses 104, 105, 106, and 107 on the LAN 103 can be found using mDNS, so that the data processing apparatus 101 obtains the detailed information of each of the print processing apparatuses 104, 105, 106, and 107 using the IPP.

In step S803, the data processing apparatus 101 determines whether a print processing apparatus supported by the print application 401 is found in the search performed up to step S802. In a case where the supported print processing apparatus exists (YES in step S803), the process proceeds to step S804. In a case where the supported print processing apparatus does not exist (NO in step S803), process proceeds to step S816.

Figure 9:
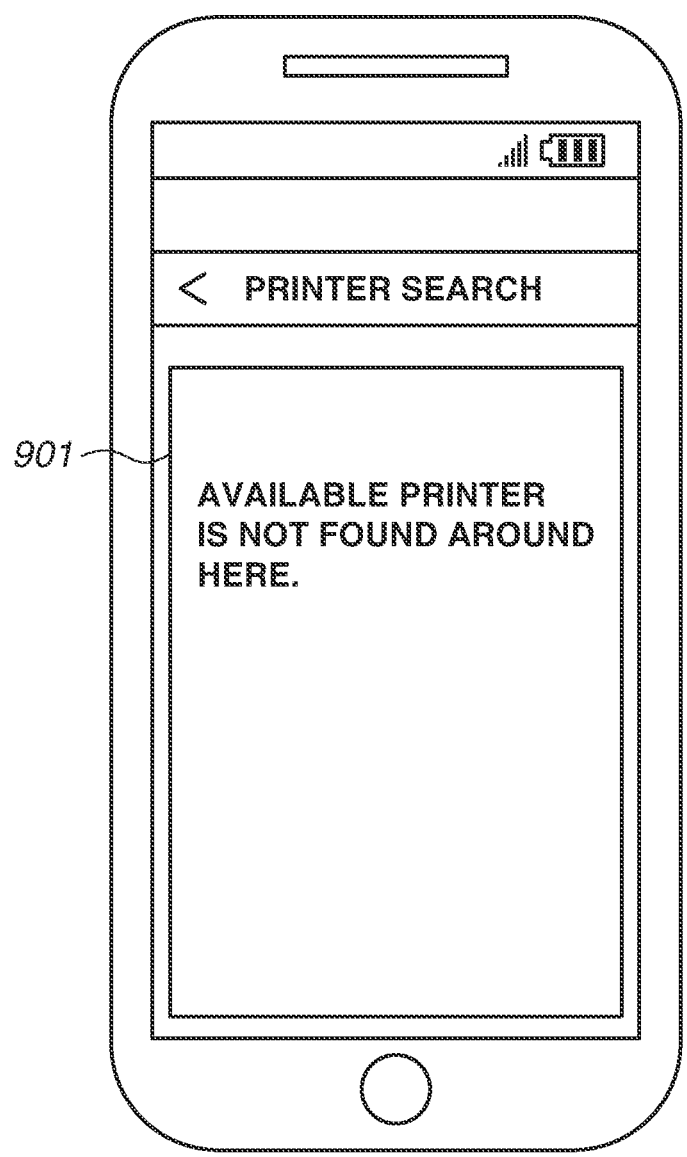
FIG. 9 is a diagram illustrating a print processing apparatus selection screen displayed on the data processing apparatus in a case where there is no print processing apparatus nearby.

In step S816, the data processing apparatus 101 displays a message indicating that the supported print processing apparatus is not found, as indicated on a screen 901 illustrated in FIG. 9.

In step S804, the data processing apparatus 101 sets an initial value of the distance to each of the print processing apparatuses 104, 105, 106, and 107 found in step S801 to "distance unknown", and displays the initial value on the UI together with the detailed information obtained in step S802.

In step S805, the data processing apparatus 101 receives a Bluetooth® Low Energy advertisement packet from each of the print processing apparatuses within the WPAN via Bluetooth® Low Energy. The Bluetooth® Low Energy advertisement packet includes the identification information of the print processing apparatus such as the IP address.

In step S806, the data processing apparatus 101 obtains format information about the packet from the advertisement packet received in step S805. As described above, the print processing apparatuses 104, 105, and 107 transmit the advertisement packets in the AirPrint Bluetooth Beacon format. The advertisement packet in the AirPrint Bluetooth Beacon format includes the Header 508, which is a common value of the AirPrint Bluetooth Beacon. Thus, in step S806, the Header 508 is obtained as the format information from the advertisement packet received in step S805.

In step S807, the data processing apparatus 101 determines whether the format information indicating a print processing apparatus supported by the print application 401 is obtained in step S806. In a case where the format information indicating the supported print processing apparatus is obtained (YES in step S807), the processing proceeds to step S808. In a case where the format information indicating the supported print processing apparatus is not obtained (NO in step S807), the processing proceeds to step S815.

In step S808, the data processing apparatus 101 obtains the IP address 512 of the print processing apparatus included in the advertisement packet received in step S805.

In step S809, the data processing apparatus 101 compares the IP address obtained in the mDNS search in step S801 with the IP address 512 obtained in step S808 for a match.

In step S810, the data processing apparatus 101 determines whether there is a print processing apparatus having a matching IP address based on the comparison performed in step S809. In a case where the IP addresses match each other (YES in step S810), the processing proceeds to step S812. In a case where the IP addresses do not match (NO in step S810), the processing proceeds to step S811.

In step S811, the data processing apparatus 101 determines whether the IP addresses of all the print processing apparatuses found in the search performed up to step S802 are compared with the IP address 512 obtained in step S808. In a case where the comparison is completed (YES in step S811), the processing proceeds to step S815. In a case where the comparison is not completed (NO in step S811), the processing returns to step S809 to compare the IP address of the print processing apparatus, which has not yet been compared, with the IP address 512.

In step S812, the data processing apparatus 101 obtains a radio wave strength of the advertisement packet received from the print processing apparatus having the matching IP address in step S810. The Bluetooth® Low Energy radio wave strength can be obtained as received signal strength indication (RSSI) from a Bluetooth® Low Energy control framework provided by the OS. For example, in the case of iOS®, RSSI can be obtained from the Bluetooth® Low Energy control framework provided as "Core Bluetooth Framework".

In step S813, the data processing apparatus 101 calculates the distance from the data processing apparatus 101 to the print processing apparatus using the Bluetooth® Low Energy radio wave strength obtained in step S812. Here, the distance to the print processing apparatus having the matching IP address in step S810 is calculated. Alternatively, the distances to all the print processing apparatuses corresponding to the advertisement packets received in step S805 can be calculated. While the distance can be calculated using only RSSI, if radio wave strengths transmitted using Bluetooth® Low Energy are different, for example, due to different print processing apparatus vendors, the distance cannot be accurately calculated using only RSSI. Thus, the distance can be calculated using RSSI and the TX power 513, which is a Bluetooth® Low Energy signal transmission strength.

In step S814, the data processing apparatus 101 displays the distance to the print processing apparatus obtained in step S813 on the UI, together with the detailed information of the print processing apparatus obtained in step S802.

In step S815, the data processing apparatus 101 determines whether a termination condition for distance information update is satisfied. The termination condition for distance information update is, for example, when a predetermined time has elapsed since receipt of the advertisement packet from the print processing apparatus, or when updating the distance to the print processing apparatus is no longer required because the user has selected a print processing apparatus as the print instruction destination. In a case where the termination condition is not satisfied (NO in step S815), the processing returns to step S805 and receives the advertisement packet. In a case where the termination condition is satisfied (YES in step S815), the data processing apparatus 101 terminates the processing.

Based on the above-described processing, the data processing apparatus 101 displays the selection screen 701 as illustrated in FIG. 7. The user selects a print processing apparatus as the print instruction destination while viewing the search results of the print processing apparatuses displayed on the data processing apparatus 101, as illustrated in FIG. 7, and returns to the top menu screen. Items 702, 704, 706, and 708 correspond to pieces of information of the print processing apparatuses 104, 105, 106, and 107 found in the search, respectively. Distances 703, 705, 707, and 709 indicate the distances from the data processing apparatus 101 to the print processing apparatuses 104, 105, 106, and 107, respectively. While an example of displaying distance information is illustrated in FIG. 7, information indicating the received radio wave strength can be displayed directly.

Since the print processing apparatus 106 is not provided with a Bluetooth® beacon, the initial value (i.e. "distance unknown") is displayed as the distance 707. In addition, the data processing apparatus 101 is sufficiently far from the print processing apparatus 107 and cannot receive the advertisement packet from the print processing apparatus 107. Thus, the initial value ("distance unknown") is displayed as the distance 709.

Figure 10:
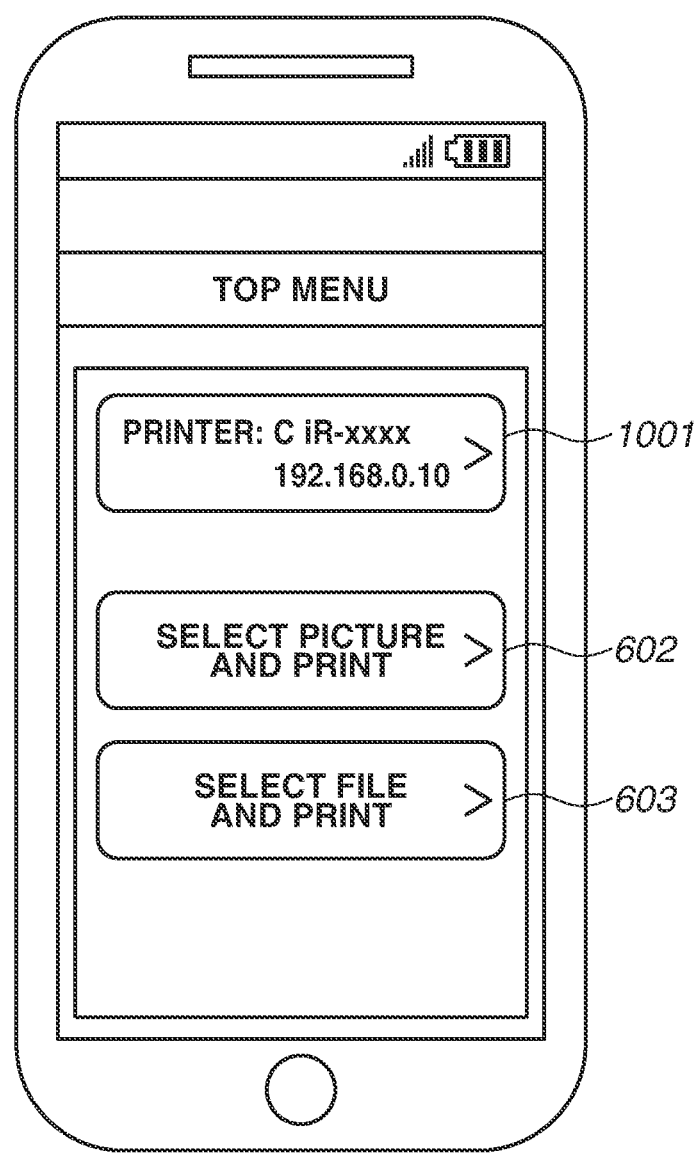
FIG. 10 is a diagram illustrating a function selection screen in a state where a print processing apparatus to be used is selected.

If the user selects a print processing apparatus as the print instruction destination on the selection screen 701 illustrated in FIG. 7 and returns to the top menu screen, the selected print processing apparatus is displayed as the print instruction destination, as illustrated in an item 1001 illustrated in FIG. 10. The user presses the button 602 or the button 603, selects an original file as a print target, and shifts to a print screen. A UI for selecting a document file is not illustrated herein.

Figure 11:
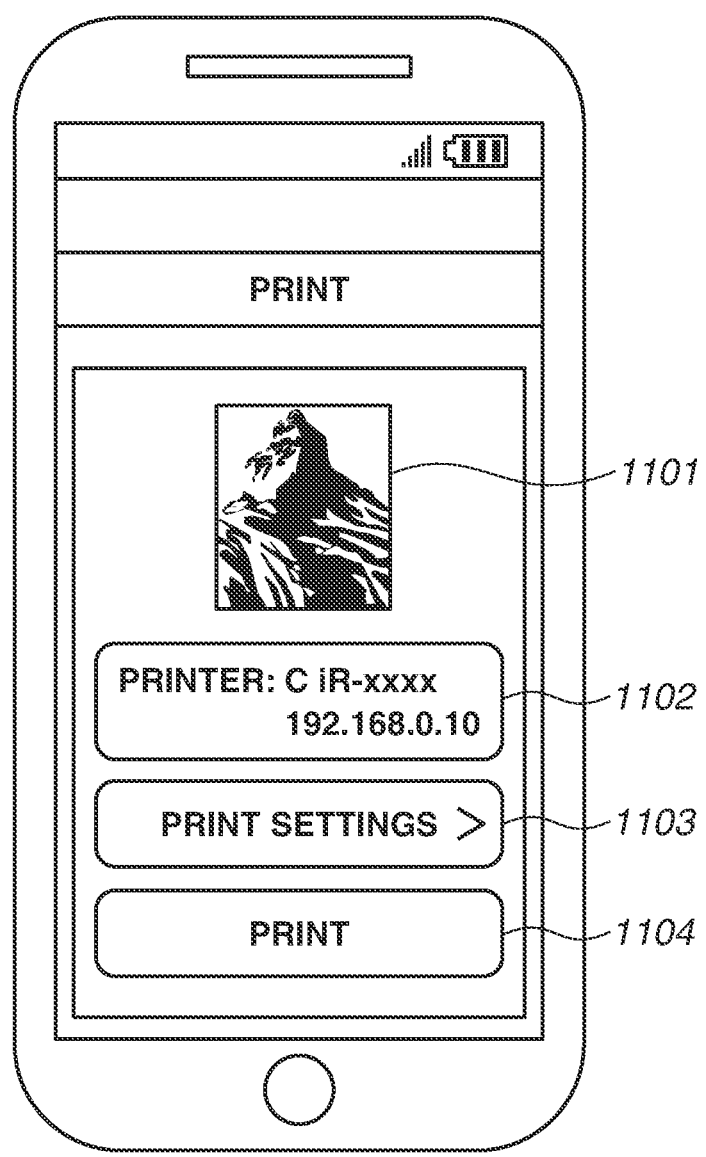
FIG. 11 is a diagram illustrating a print preview screen displayed on the data processing apparatus.
Figure 12:
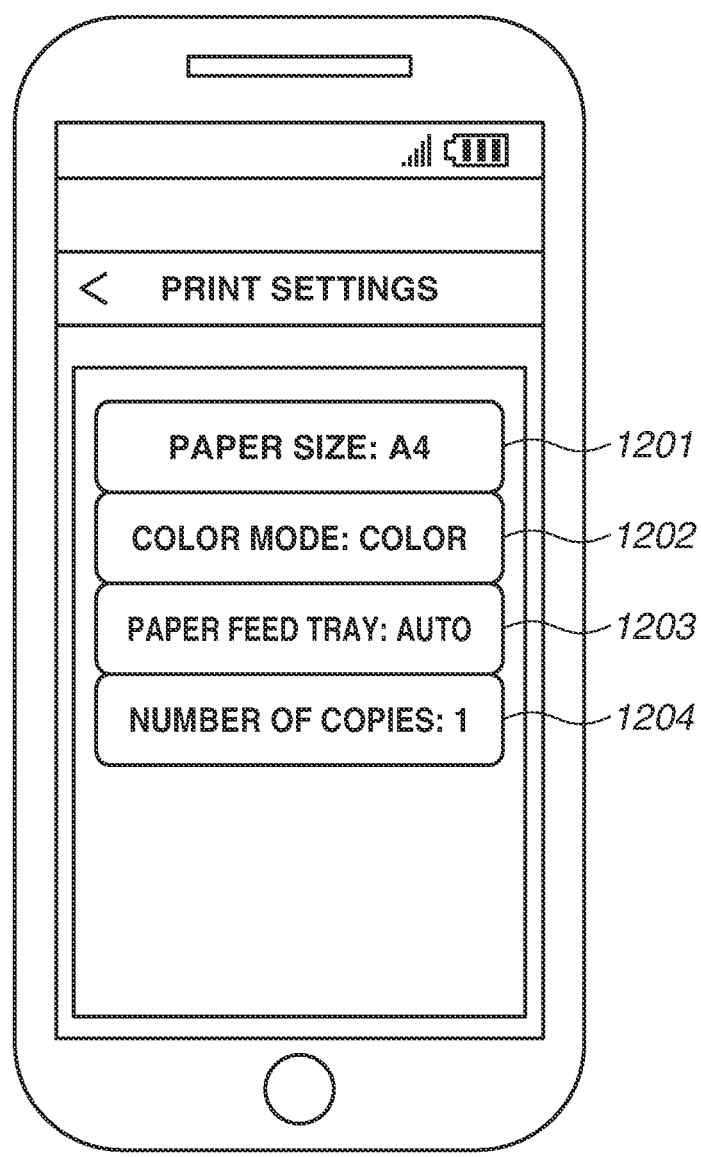
FIG. 12 is a diagram illustrating a print settings screen displayed on the data processing apparatus.

FIG. 11 illustrates a user interface of the print screen for making print settings for the selected original file and printing the file. A preview 1101 of the original file selected by the user is displayed. An item 1102 indicates the information of the print processing apparatus selected as the print instruction destination on the selection screen 701. A button 1103 is used to make the print settings, and when the user presses the button 1103, the print screen shifts to a print settings screen for making print settings as illustrated in FIG. 12.

The user sets a paper size 1201, a color mode 1202, a paper feed tray 1203, and a number of copies 1204 on the print settings screen and returns to the print screen illustrated in FIG. 11.

When the user presses a print button 1104 on the print screen, a print job is generated and transmitted to the print processing apparatus displayed in the item 1102. The user then returns to the top menu screen and the processing ends.

With the above-described processing, if the data processing apparatus 101 searches for print processing apparatuses on the LAN 103 that the data processing apparatus 101 participates in, and a plurality of print processing apparatuses is found in the search, the data processing apparatus 101 displays, as the search results, the distance to each of the print processing apparatuses together with the detailed information of the corresponding print processing apparatus. Accordingly, the user can identify the print processing apparatus in front of the user that is likely to be desired by the user.

In the processing in the flowchart in FIG. 8, mDNS communication and IPP communication are performed first and then Bluetooth® Low Energy communication is performed. However, the order of communication is not limited thereto, and Bluetooth® Low Energy communication can be performed first. In addition, the detailed information of the print processing apparatus is obtained by performing mDNS communication and then IPP communication, but the method for obtaining the detailed information is not limited thereto. For example, the detailed information can be obtained by performing IPP communication with the IP address included in the received Bluetooth® Low Energy advertisement packet. In this case, the detailed information obtained by performing IPP communication and the distance information obtained by using the Bluetooth® Low Energy advertisement packet are also simultaneously displayed.

In the case of the search for print processing apparatuses according to the first exemplary embodiment, all the print processing apparatuses existing on the LAN and found in the search are displayed in a list form. Thus, the user needs to check the entire list and search for a desired print processing apparatus (e.g. a print processing apparatus nearby). In a second exemplary embodiment, instead of displaying a list of information of all the print processing apparatuses found in the search as the search results, a method of grouping the print processing apparatuses based on the distances from the data processing apparatus 101 and then displaying the information on a distance group basis will be described. A basic configuration according to the second exemplary embodiment is similar to the configuration according to the first exemplary embodiment, and thus only the differences will be described below.

Figure 13:
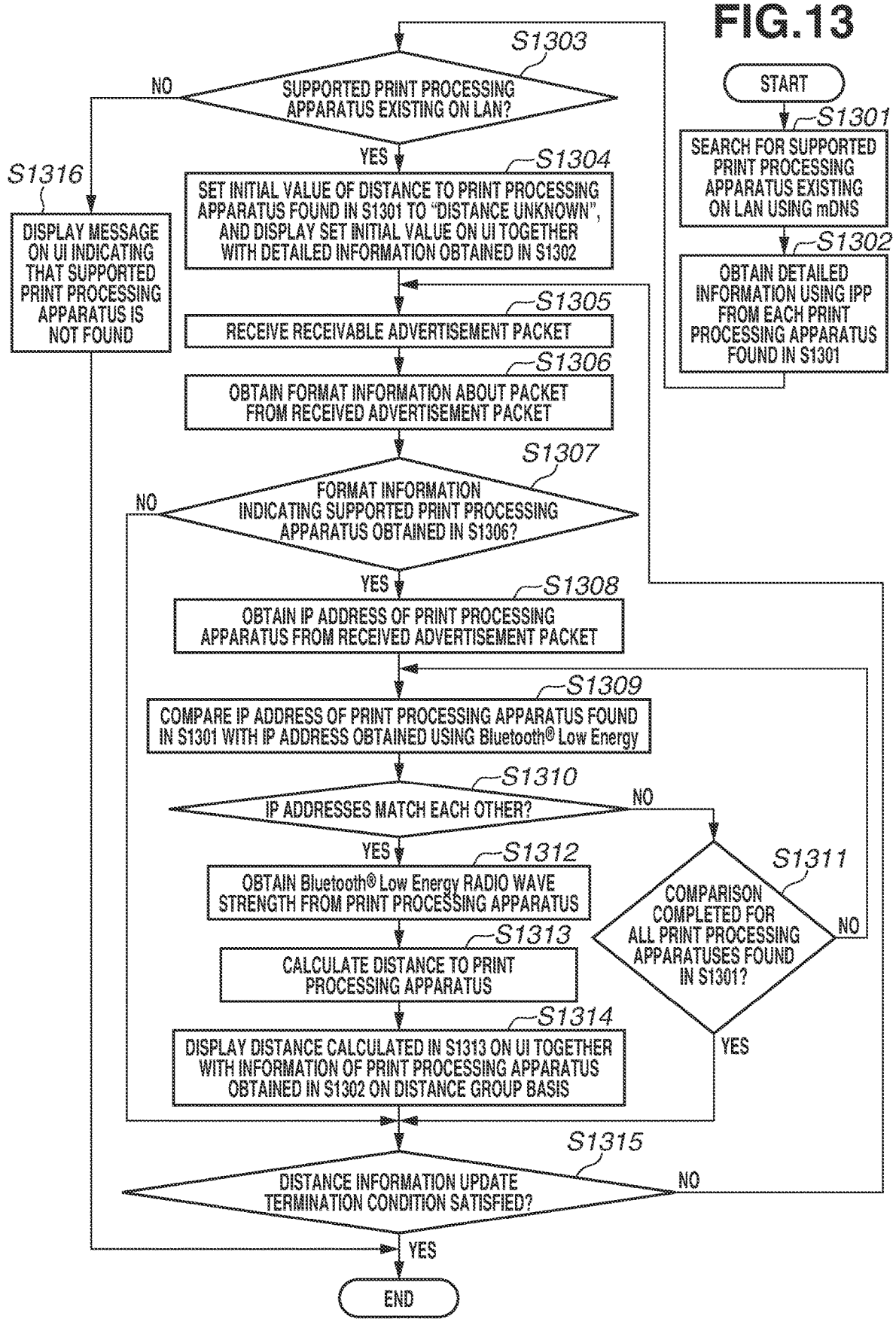
FIG. 13 is a flowchart illustrating a processing flow performed by a data processing apparatus according to a second exemplary embodiment.

FIG. 13 is a flowchart illustrating processing for searching for print processing apparatuses, which is performed by the data processing apparatus 101 according to the second exemplary embodiment. The processing other than step S1314 in the flowchart, i.e., steps S1301-S1313 and S1315, according to the second exemplary embodiment is similar to the processing other than step S814 in the flowchart according to the first exemplary embodiment, and thus the description thereof will be omitted.

The second exemplary embodiment is different from the first exemplary embodiment in that, in step S1314, the print processing apparatuses are divided into distance groups, and listed and displayed on a distance group basis. More specifically, the print processing apparatuses are classified based on the distances calculated in step S1313 and with reference to a distance table 1400 illustrated in FIG. 14. Then, the print processing apparatuses belonging to the groups closer to the data processing apparatus 101 are preferentially displayed.

Figure 15:
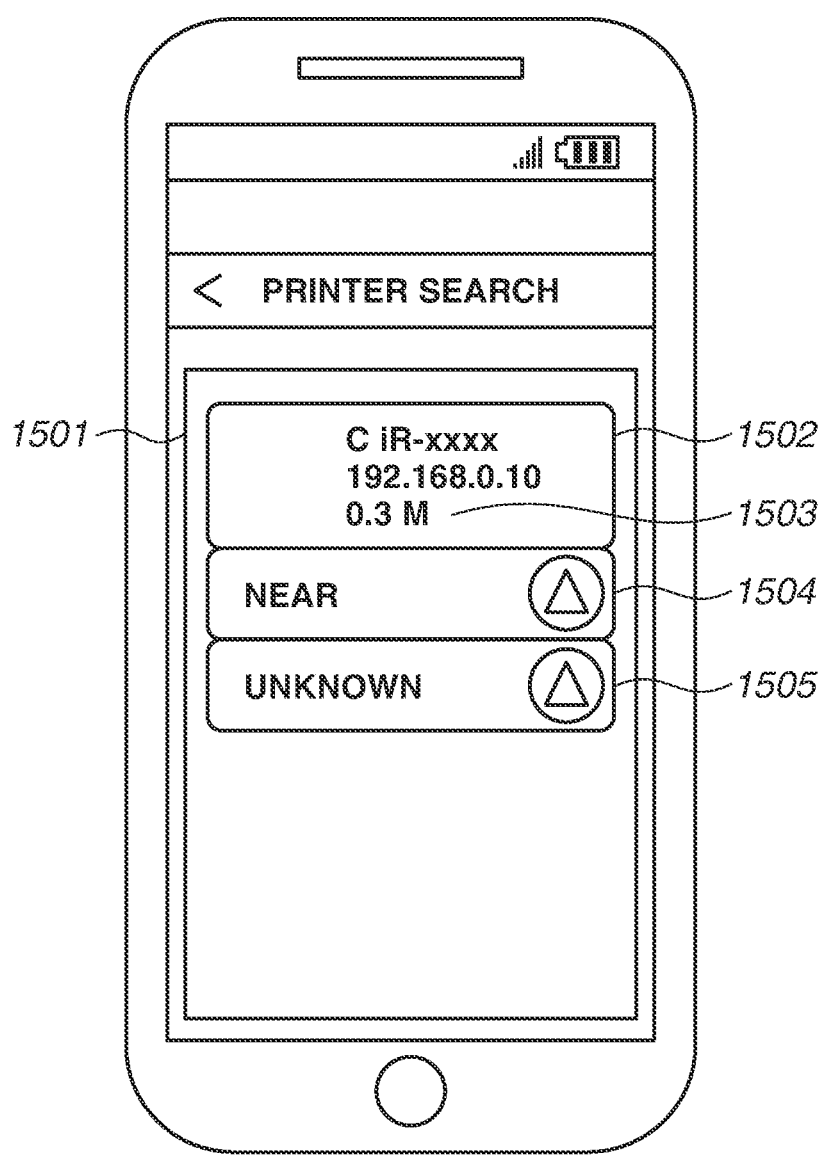
FIG. 15 is a diagram illustrating a print processing apparatus selection screen displayed on the data processing apparatus according to the second exemplary embodiment.

FIG. 15 illustrates a screen 1501 that displays the search results of the print processing apparatuses obtained by the data processing apparatus 101 using the method according to the second exemplary embodiment, in the configuration of the data processing system illustrated in FIG. 1.

Among the print processing apparatuses 104, 105, 106, and 107, the print processing apparatus 104 is classified into the distance group "Immediate" (indicating that the distance from the data processing apparatus 101 is 60 cm or less) based on the distance table 1400, and is preferentially displayed on an upper part 1502 of a search result list.

The print processing apparatus 105 that is classified into the distance group "Near" based on the distance table 1400 is included in a menu 1504. In the menus 1504 and 1505, the print processing apparatuses belonging to the same distance groups ("Near" and "Unknown") are collectively included, and the information of the print processing apparatuses is hidden in the initial state.

The print processing apparatuses 106 and 107 that are classified into the distance group "Unknown" based on the distance table 1400 are included in the menu 1505, and the information of the print processing apparatuses is hidden in the initial state.

Figure 16:
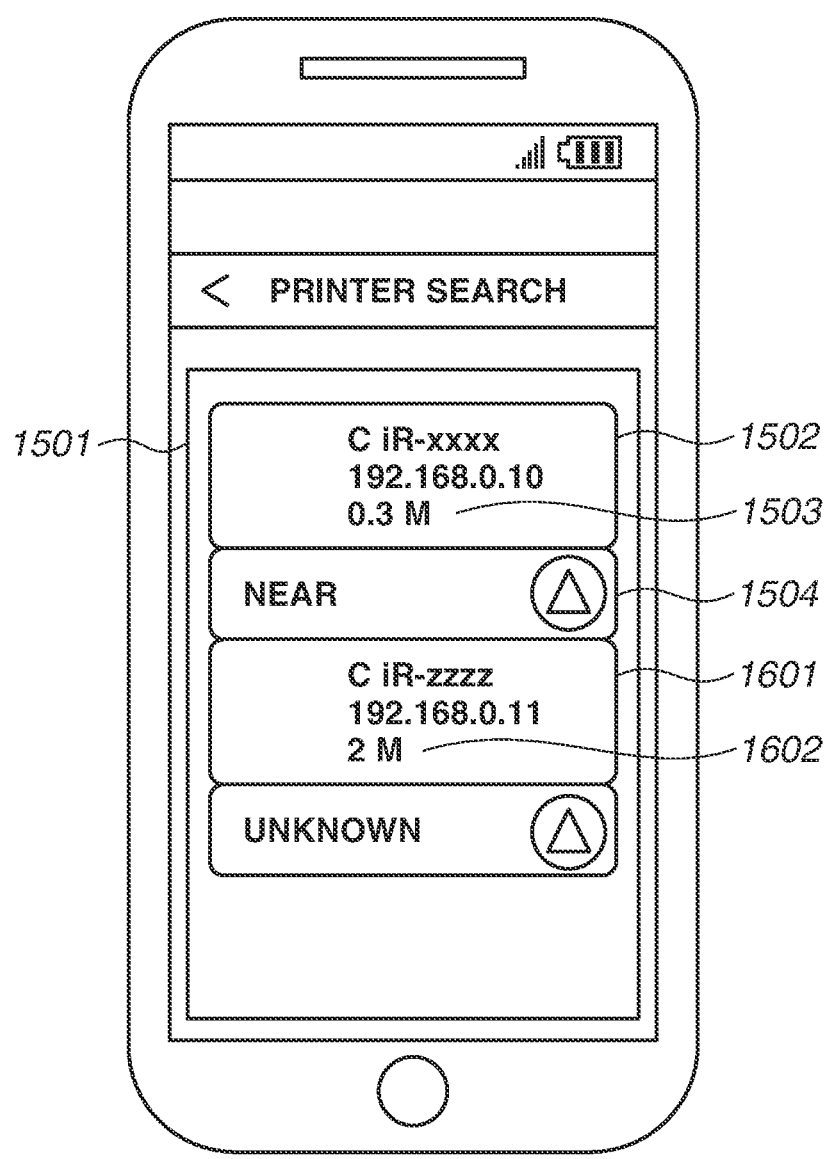
FIG. 16 is a diagram illustrating another print processing apparatus selection screen displayed on the data processing apparatus according to the second exemplary embodiment.

FIG. 16 illustrates a screen displayed in a case where the menu 1504 is tapped. If the user taps the menu 1504, the information of the print processing apparatus belonging to the distance group "Near" is displayed.

If the user taps the menu 1504 again, the information of the print processing apparatus belonging to the distance group "Near" is hidden, and the screen returns to the screen 1501 illustrated in FIG. 15.

The above-described processing can prevent deterioration of visibility due to displaying a list of all the print processing apparatuses found by the data processing apparatus 101 on a search result screen. The print processing apparatus that is close to the user and is likely to be desired by the user is preferentially displayed, and thus the user can easily identify the desired print processing apparatus.

In the first exemplary embodiment, the distance from the data processing apparatus 101 to each print processing apparatus is indicated in the search results so that the user can easily select the desired print processing apparatus. However, in a case where a plurality of print processing apparatuses is located at approximately the same distance from the data processing apparatus 101, the user cannot identify the desired print processing apparatus based only on the distance information. In a third exemplary embodiment, an example will be described in which direction information is displayed as the search results in addition to the distance information.

A basic configuration according to the third exemplary embodiment is similar to the configuration according to the first exemplary embodiment, and thus only the differences will be described below.

Figure 17:
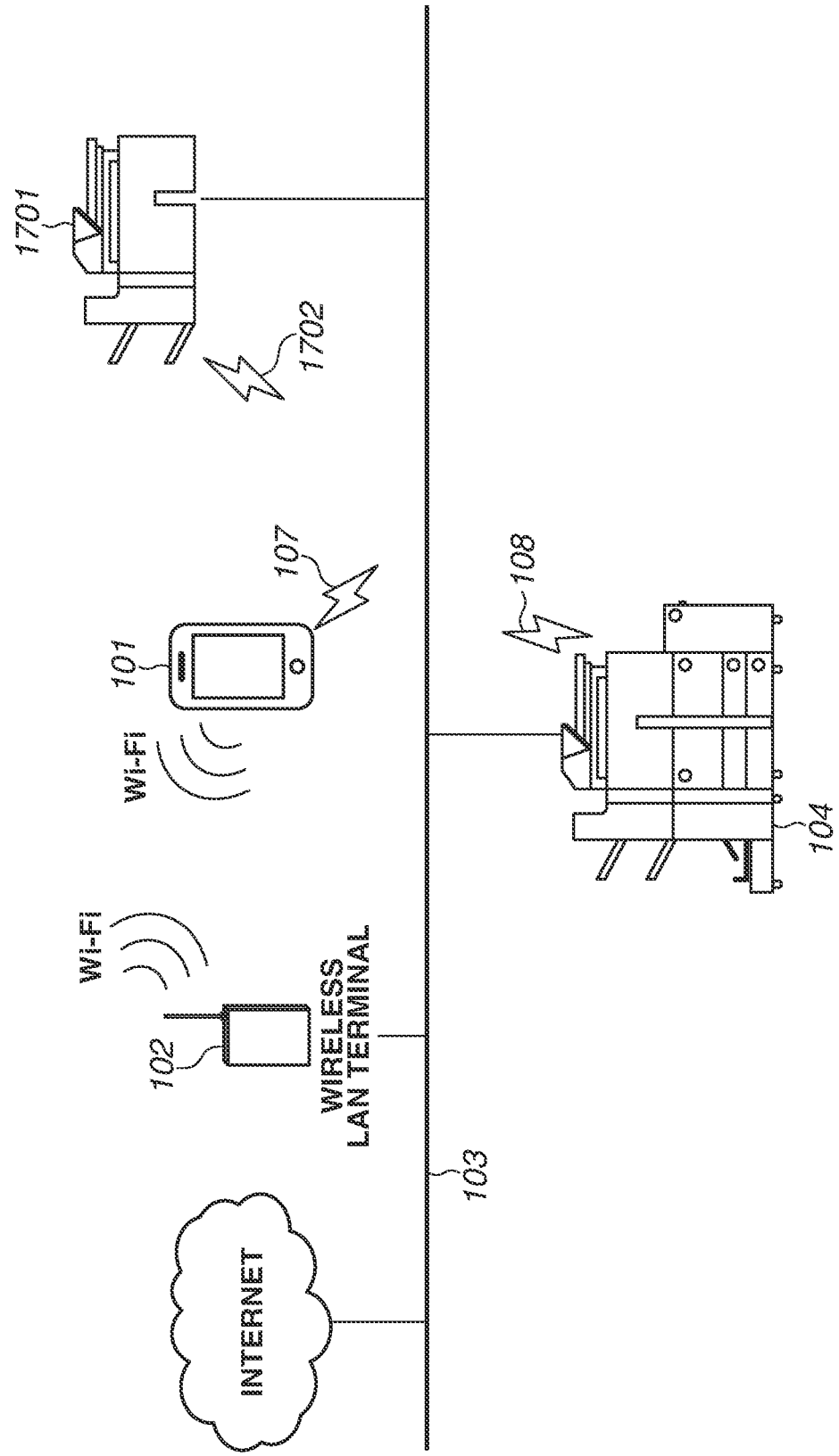
FIG. 17 is a diagram illustrating a configuration of a data processing system according to a third exemplary embodiment.

FIG. 17 illustrates a system configuration according to the third exemplary embodiment. As illustrated in FIG. 17, a print processing apparatus 1701 and the print processing apparatus 104 are located at approximately the same distance from the data processing apparatus 101 and are connected to the LAN 103.

Figure 18:
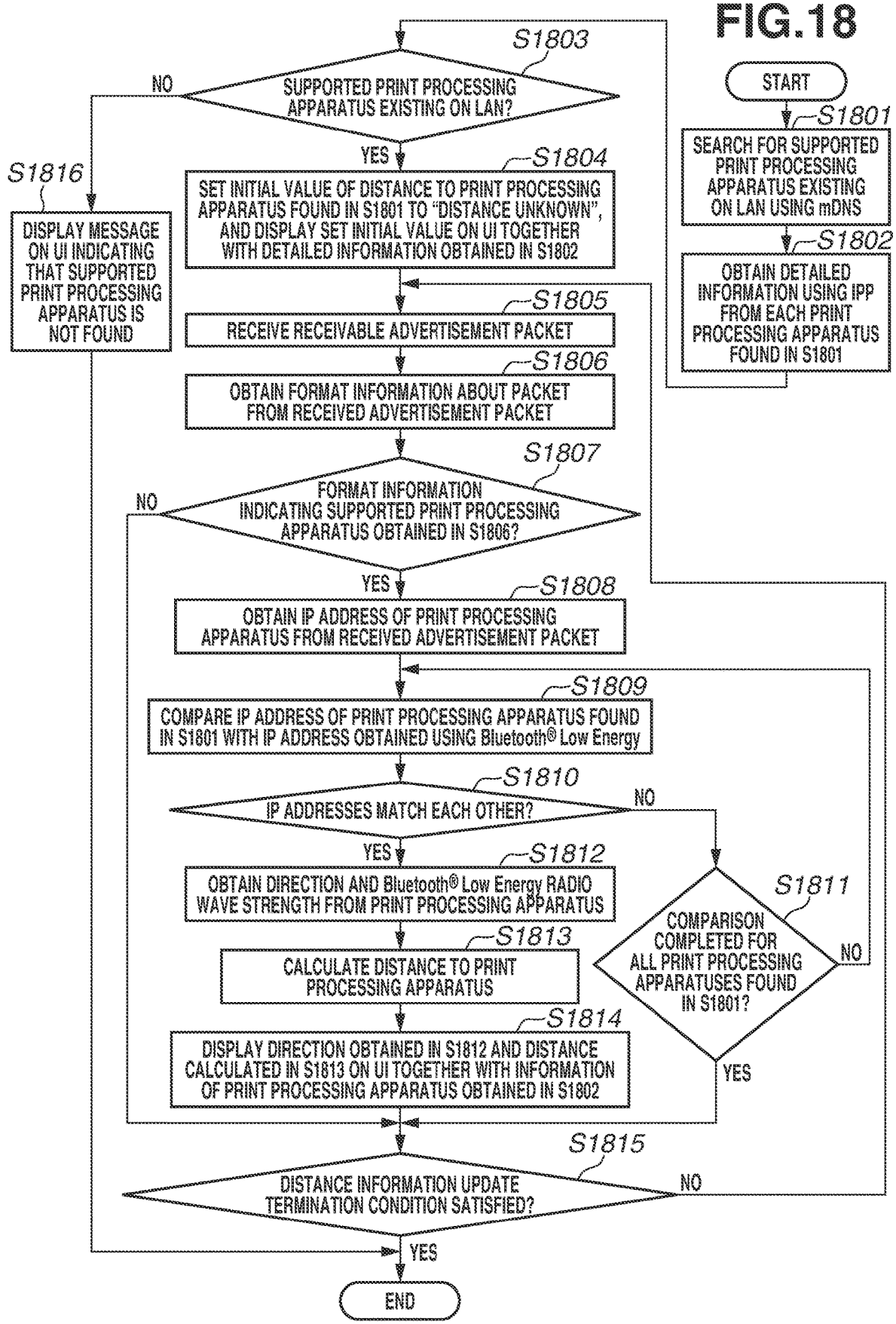
FIG. 18 is a flowchart illustrating a processing flow performed by a data processing apparatus according to the third exemplary embodiment.

FIG. 18 is a flowchart illustrating processing for searching for print processing apparatuses, which is performed by the data processing apparatus 101 according to the third exemplary embodiment. The processing other than steps S1812 and S1814, i.e., steps S1801-1811, S1813, S1815, in the flowchart according to the third exemplary embodiment is similar to the processing other than steps S812 and S814 in the flowchart according to the first exemplary embodiment, and thus the descriptions thereof will be omitted.

The third exemplary embodiment is different from the first exemplary embodiment in that, in step S1812, a direction of the print processing apparatus is obtained and, in step S1814, the direction of the print processing apparatus is displayed as the search results.

In a case where the print processing apparatus is provided with a Bluetooth® 5.1 beacon and the data processing apparatus 101 supports Bluetooth® 5.1, the data processing apparatus 101 can obtain the direction of the print processing apparatus. In this case, it is necessary to provide at least an antenna for transmitting the advertisement packet and an antenna for receiving the advertisement packet, in a plurality of numbers.

In step S1812, the data processing apparatus 101 obtains information about the direction of the print processing apparatus together with the Bluetooth® Low Energy radio wave strength.

In step S1814, the data processing apparatus 101 displays the information about the direction of the print processing apparatus obtained in step S1812 on the search result screen, together with the distance to the print processing apparatus obtained in step S1813 and the detailed information of the print processing apparatus obtained in step S1802.

Figure 19:
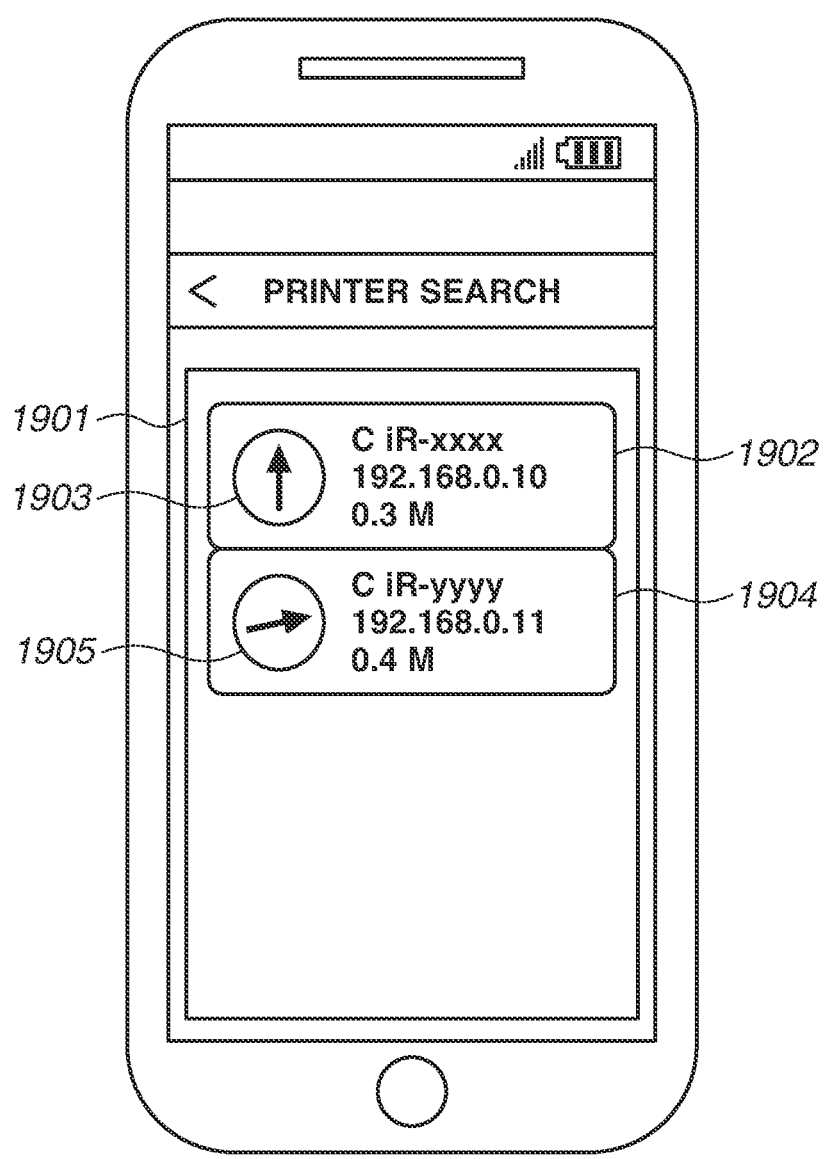
FIG. 19 is a diagram illustrating a print processing apparatus selection screen displayed on the data processing apparatus according to the third exemplary embodiment.

FIG. 19 illustrates a screen 1901 that displays the search results obtained by the data processing apparatus 101 on a UI by using the method according to the third exemplary embodiment.

Items 1902 and 1904 correspond to pieces of information of the print processing apparatuses 104 and 1701 found in the search, respectively. Directions in which the print processing apparatuses 104 and 1701 are located with respect to the data processing apparatus 101 are indicated in forms 1903 and 1905 on a left side of the items 1902 and 1904, respectively.

Based on the above-described processing, the information about the direction of each of the print processing apparatuses is displayed in addition to the search results of the print processing apparatuses obtained by the mobile terminal according to the first exemplary embodiment. Thus, even if there is a plurality of print processing apparatuses near the user, the user can identify the desired print processing apparatus.

Embodiment(s) can also be realized by a computer of a system or apparatus that reads out and executes computer executable instructions (e.g., one or more programs)

recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2019-199112, filed Oct. 31, 2019, which is hereby incorporated by reference herein in its entirety.

What is claimed is:

1. A method for controlling a terminal that searches for an apparatus, the method comprising:
obtaining first information about the apparatus by using a first wireless communication method;
obtaining second information about the apparatus by using a second wireless communication method, wherein the second wireless communication method is a communication method different from the first wireless communication method, and information obtained by the second wireless communication method and information obtained by the first wireless communication method are different from each other;
associating the first information and the second information with each other based on an identifier of the apparatus; and
displaying the first information and the second information as information about the apparatus on a search result screen so that a user recognizes that the first information and the second information are associated with each other.

2. The method according to claim 1, wherein the first wireless communication method is Bluetooth®.

3. The method according to claim 1, wherein the second wireless communication method is a wireless local area network (LAN).

4. The method according to claim 1, wherein the first information is information based on the strength of a radio wave relating to the first wireless communication.

5. The method according to claim 4, wherein the first information is information about a position of the apparatus.

6. The method according to claim 5, wherein the information about the position indicates a distance from the terminal to the apparatus or a direction in which the apparatus is located with respect to the terminal.

7. The method according to claim 3, wherein the second wireless communication method is communication based on Internet Printing Protocol (IPP) or Internet Printing Protocol Secure (IPPS).

8. The method according to claim 1, wherein the second information includes an apparatus name of the apparatus.

9. The method according to claim 1, wherein the identifier of the apparatus is an Internet Protocol (IP) address.

10. The method according to claim 1,
wherein information is obtained by the first wireless communication method from a plurality of apparatuses, and
wherein the plurality of apparatuses is grouped based on information based on the strength of the radio wave relating to the first wireless communication method from each of the plurality of the apparatuses, and pieces of information of the plurality of apparatuses are displayed on a group-by-group basis.

11. The method according to claim 1,
wherein information is obtained by the first wireless communication method from a plurality of apparatuses, and
wherein an apparatus satisfying a predetermined condition is preferentially displayed from among the plurality of apparatuses, based on information based on the strength of the radio wave relating to the first wireless communication method from each of the plurality of apparatuses.

12. The method according to claim 1, wherein the apparatus is a printing apparatus and the terminal transmits a print instruction to the apparatus.

13. The method according to claim 1, wherein the first information is information based on a strength of a signal of the first wireless communication method, and the second information is information included in a packet of the second wireless communication method.

14. The method according to claim 1, wherein information indicating a distance to the apparatus is obtainable by the first wireless communication method but capability information about the apparatus is not obtainable by the first wireless communication method, and the information indicating a distance to the apparatus is not obtainable by the second wireless communication method but the capability information about the apparatus is obtainable by the second wireless communication method.

15. The method according to claim 1, wherein the first information is information not obtainable by the second wireless communication method, and the second information is information not obtainable by the first wireless communication method.

16. The method according to claim 1, wherein the first information is information indicating a position of the apparatus, and the second information is an apparatus name or capability information of the apparatus.

17. The method according to claim 1, wherein a plurality of first display objects corresponding to a plurality of apparatuses is displayed on the search result screen, and the first information and the second information are displayed in one of the first display objects.

18. The method according to claim 1, wherein the first information and the second information are displayed for each apparatus on the search result screen so that a user recognizes that the first information and the second information corresponding to each apparatus are associated with each other.

19. A terminal that searches for an apparatus, the terminal comprising:
    a memory storing instructions; and
    at least one processor in communication with the memory, wherein the at least one processor executes the instructions to:
        obtain first information about the apparatus by using a first wireless communication method;
        obtain second information about the apparatus by using a second wireless communication method, wherein the second wireless communication method is a communication method different from the first wireless communication method, and information obtained by the second wireless communication method and information obtained by the first wireless communication method are different from each other;
        associate the first information and the second information with each other based on an identifier of the apparatus; and
        display the first information and the second information as information about the apparatus on a search result screen so that a user recognizes that the first information and the second information are associated with each other.

20. A non-transitory computer-readable storage medium storing a program to cause a computer to perform a method for controlling a terminal that searches for an apparatus, the method comprising:
    obtaining first information about the apparatus by using a first wireless communication method;
    obtaining second information about the apparatus by using a second wireless communication method, wherein the second wireless communication method is a communication method different from the first wireless communication method, and information obtained by the second wireless communication method and information obtained by the first wireless communication method are different from each other;
    associating the first information and the second information with each other based on an identifier of the apparatus; and
    displaying the first information and the second information as information about the apparatus on a search result screen so that a user recognizes that the first information and the second information are associated with each other.

* * * * *